(12) United States Patent
Shiga

(10) Patent No.: US 12,073,077 B2
(45) Date of Patent: Aug. 27, 2024

(54) VEHICLE-MOUNTED DEVICE, VEHICLE, CONTROL METHOD FOR DISPLAYING CONTENT AND CLIMATE CONTROLS CONCURRENTLY

(71) Applicant: TOYOTA JIDOSHA KABUSHIKI KAISHA, Toyota (JP)

(72) Inventor: Kazuyuki Shiga, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/931,203

(22) Filed: Sep. 12, 2022

(65) Prior Publication Data

US 2023/0080359 A1 Mar. 16, 2023

(30) Foreign Application Priority Data

Sep. 16, 2021 (JP) ................. 2021-151506

(51) Int. Cl.
*G06F 3/04886* (2022.01)
*B60H 1/00* (2006.01)
(Continued)

(52) U.S. Cl.
CPC ..... *G06F 3/04886* (2013.01); *B60H 1/00985* (2013.01); *B60K 35/00* (2013.01);
(Continued)

(58) Field of Classification Search
CPC ............ B60H 1/00985; B60K 2370/11; B60K 2370/111; B60K 2370/113; B60K 2370/115; B60K 2370/117; B60K 2370/119; B60K 2370/152; B60K 2370/122; B60K 2370/1438; B60K 2370/1468; B60K 2370/1534;
(Continued)

(56) References Cited

U.S. PATENT DOCUMENTS

2012/0185805 A1\* 7/2012 Louch ................. G06F 3/04812
715/862
2014/0096050 A1\* 4/2014 Boblett .............. G01C 21/3667
715/769

(Continued)

FOREIGN PATENT DOCUMENTS

EP       2 838 002 A1   2/2015
JP       2011-218909 A  11/2011
JP       2013-222270    10/2013

*Primary Examiner* — Daniel Samwel
(74) *Attorney, Agent, or Firm* — Oblon, McClelland, Maier & Neustadt, L.L.P.

(57) ABSTRACT

In a vehicle-mounted device having a touchscreen, a controller separately displays a first image displaying an operation unit that is operated for air conditioning in a vehicle interior or temperature adjustment of pieces of equipment and a second image displaying image information different from the first image on the touchscreen. The vehicle-mounted device has a first pattern and a second pattern as a display pattern for separately displaying the first image and the second image. The second pattern has a smaller display region for the first image and a larger display region for the second image than the first pattern. The controller separately displays the first image and the second image in a display pattern that is either the first pattern or the second pattern.

11 Claims, 8 Drawing Sheets

(51) Int. Cl.
  *B60K 35/00* (2024.01)
  *B60K 35/10* (2024.01)
  *B60K 35/22* (2024.01)
  *B60K 35/28* (2024.01)
  *G06F 3/04817* (2022.01)
  *G06F 3/0484* (2022.01)

(52) U.S. Cl.
  CPC ............ *G06F 3/0484* (2013.01); *B60K 35/10* (2024.01); *B60K 35/22* (2024.01); *B60K 35/28* (2024.01); *B60K 2360/1438* (2024.01); *B60K 2360/166* (2024.01); *G06F 3/04817* (2013.01); *G06F 2203/04803* (2013.01)

(58) Field of Classification Search
  CPC ........ B60K 2370/168; B60K 2370/164; B60K 2370/165; B60K 2370/166; B60K 35/00; B60K 35/28; B60K 35/10; B60K 35/22; B60K 2360/166; B60K 2360/1438; G06F 3/0484; G06F 3/04817; G06F 3/04886; G06F 2203/04803
  See application file for complete search history.

(56) References Cited

U.S. PATENT DOCUMENTS

| | | | |
|---|---|---|---|
| 2014/0344754 A1* | 11/2014 | Lai | G06F 3/04842 715/830 |
| 2015/0094910 A1* | 4/2015 | Bassier | G06F 3/0412 345/173 |
| 2016/0077652 A1 | 3/2016 | Yang | |
| 2016/0288643 A1* | 10/2016 | Kötter | G06F 3/04842 |
| 2018/0059912 A1* | 3/2018 | Takikawa | G06F 3/04883 |
| 2019/0268537 A1* | 8/2019 | Jang | H04N 23/80 |
| 2020/0233567 A1* | 7/2020 | Boyagian | G06F 3/0482 |
| 2021/0206272 A1* | 7/2021 | Tuzar | G06F 3/0488 |

* cited by examiner

VEHICLE-MOUNTED DEVICE, VEHICLE, CONTROL METHOD FOR DISPLAYING CONTENT AND CLIMATE CONTROLS CONCURRENTLY

CROSS REFERENCE TO THE RELATED APPLICATION

This application claims the benefit of Japanese Patent Application No. 2021-151506, filed on Sep. 16, 2021, which is hereby incorporated by reference herein in its entirety.

BACKGROUND

Technical Field

The present disclosure relates to display of image information in a vehicle-mounted device.

Description of the Related Art

Patent Literature 1 discloses a vehicle-mounted operation display device. The vehicle-mounted operation display device disclosed in Patent Literature 1 includes a monitor having a touch panel and a plurality of mechanical switches. The plurality of mechanical switches are disposed around the monitor. An icon corresponding to a function of an operated mechanical switch is displayed on the monitor.

CITATION LIST

Patent Literature

Patent Literature 1: Japanese Patent Application Laid-Open Publication No. 2011-218909

SUMMARY

An object of the present disclosure is to provide a technique capable of more suitably displaying an operation unit that is operated for air conditioning in a vehicle interior or temperature adjustment of pieces of equipment on a touchscreen of a vehicle-mounted device.

A vehicle-mounted device according to a first aspect of the present disclosure
- is a vehicle-mounted device having a touchscreen, including
- a controller configured to separately display a first image displaying an operation unit that is operated for air conditioning in a vehicle interior or temperature adjustment of pieces of equipment and a second image displaying image information different from the first image on the touchscreen,
- wherein the vehicle-mounted device has a first pattern and a second pattern as a display pattern for separately displaying the first image and the second image, and the second pattern has a smaller display region for the first image and a larger display region for the second image than the first pattern, and
- the controller separately displays the first image and the second image in a display pattern that is either the first pattern or the second pattern.

A vehicle according to a second aspect of the present disclosure is equipped with the vehicle-mounted device according to the first aspect of the present disclosure.

A control method for a vehicle-mounted device according to a third aspect of the present disclosure
- is a control method for a vehicle-mounted device having a touchscreen, including
- separately displaying a first image displaying an operation unit that is operated for air conditioning in a vehicle interior or temperature adjustment of pieces of equipment and a second image displaying image information different from the first image on the touchscreen,
- wherein the vehicle-mounted device has a first pattern and a second pattern as a display pattern for separately displaying the first image and the second image, and the second pattern has a smaller display region for the first image and a larger display region for the second image than the first pattern, and
- the first image and the second image are separately displayed in a display pattern that is either the first pattern or the second pattern in the control method.

A program according to a fourth aspect of the present disclosure
- is a program for controlling a vehicle-mounted device having a touchscreen,
- the program causing the vehicle-mounted device to separately display a first image displaying an operation unit that is operated for air conditioning in a vehicle interior or temperature adjustment of pieces of equipment and a second image displaying image information different from the first image on the touchscreen,
- wherein the vehicle-mounted device has a first pattern and a second pattern as a display pattern for separately displaying the first image and the second image, and the second pattern has a smaller display region for the first image and a larger display region for the second image than the first pattern, and
- the program causes the vehicle-mounted device to separately display the first image and the second image in a display pattern that is either the first pattern or the second pattern.

According to the present disclosure, it is possible to more suitably display the operation unit that is operated for the air conditioning in the vehicle interior or the temperature adjustment of the pieces of equipment on the touchscreen of the vehicle-mounted device.

DESCRIPTION OF THE EMBODIMENTS

Figure 1:
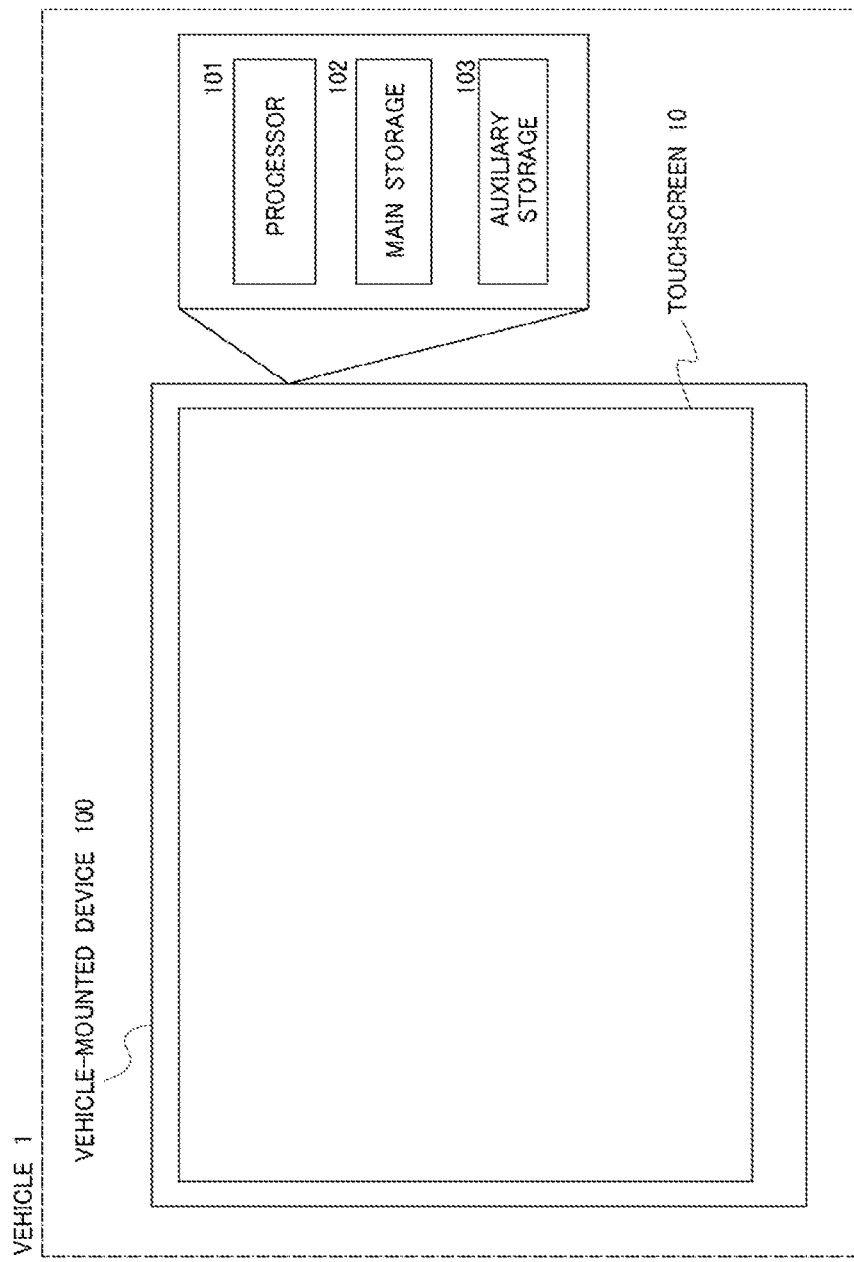
FIG. 1 is a diagram illustrating a schematic configuration of a vehicle-mounted device according to an embodiment.

A vehicle-mounted device according to a first aspect of the present disclosure has a touchscreen. The touchscreen displays image information to be provided to a user and accepts input by the user's touch operation. In the vehicle-mounted device, a controller separately displays a first image and a second image on the touchscreen.

The first image is an image displaying an operation unit that is operated for air conditioning in a vehicle interior or temperature adjustment of pieces of equipment. That is, a user can perform the air conditioning in the vehicle interior or the temperature adjustment of the pieces of equipment by performing a touch operation on the operation unit displayed as the first image on the touchscreen. The second image is an image displaying image information different from the first image, i.e., image information different from the operation unit. As the image information displayed as the second image, map information for navigation or image information of video content can be named.

In the vehicle-mounted device, the operation unit displayed as the first image on the touchscreen is operated by a user in the vehicle interior with relatively high frequency. For this reason, even if the second image is displayed on the touchscreen, the first image is also displayed separately from the second image. This makes it possible to improve convenience when the user performs the air conditioning in the vehicle interior or the temperature adjustment of the pieces of equipment. Note that the user may wish to display more image information as the second image or display the second image with a larger size while separately displaying the first image and the second image on the touchscreen.

Under the circumstances, the vehicle-mounted device according to the first aspect of the present disclosure has a first pattern and a second pattern as a display pattern for separately displaying the first image and the second image on the touchscreen. That is, the first image and the second image are separately displayed on the touchscreen in each of the first pattern and the second pattern. Note that the first pattern and the second pattern are different in a size of a region where the first image is to be displayed and a size of a region where the second image is to be displayed on the touchscreen. Particularly, the second pattern has a smaller display region for the first image and a larger display region for the second image than the first pattern. The controller separately displays the first image and the second image in a display pattern that is either the first pattern or the second pattern.

The vehicle-mounted device according to the first aspect of the present disclosure is capable of switching between the first pattern and the second pattern as a display pattern for separately displaying the first image and the second image on the touchscreen in accordance with a user's request in the vehicle-mounted device. Thus, separate display of the first image and the second image compliant with the user's request is possible.

Specific embodiments of the present disclosure will be described below on the basis of the drawings. The technical scope of the present disclosure is not limited to sizes, materials, shapes, relative arrangement, and the like of constituent components described in the present embodiments unless otherwise described.

First Embodiment (Schematic Configuration of Vehicle-Mounted Device)

FIG. 1 is a diagram illustrating a schematic configuration of a vehicle-mounted device according to the present embodiment. A vehicle-mounted device 100 is a device which is to be mounted on a vehicle 1. The vehicle-mounted device 100 is configured to include a computer having a processor 101, a main storage 102, and an auxiliary storage 103. The vehicle-mounted device 100 also has a touchscreen 10. The touchscreen 10 is a device including a display for displaying image information to be provided to a user and a touch panel for accepting input by the user's touch operation.

The processor 101 performs arithmetic processing for controlling the vehicle-mounted device 100. The processor 101 is, for example, a CPU (Central Processing Unit) or a DSP (Digital Signal Processor). The main storage 102 is, for example, a RAM (Random Access Memory). The auxiliary storage 103 is, for example, a ROM (Read Only Memory), an HDD (Hard Disk Drive), or a flash memory. The auxiliary storage 103 may include a removable medium (removable recording medium). The removable medium here is, for example, a USB memory, an SD card, or a disc recording medium, such as a CD-ROM, a DVD, or a Blu-ray Disc.

An operating system (OS), various types of programs, and various types of information tables are stored in the auxiliary storage 103. Various types of image information to be displayed on the touchscreen 10 are also stored in the auxiliary storage 103. The processor 101 loads a program stored in the auxiliary storage 103 into the main storage 102 and executes the program, thereby implementing control for displaying various types of image information on the touchscreen 10. Note that the processor 101 corresponds to a "controller" according to the present disclosure in the present embodiment.

(Display Pattern)

Figure 2:
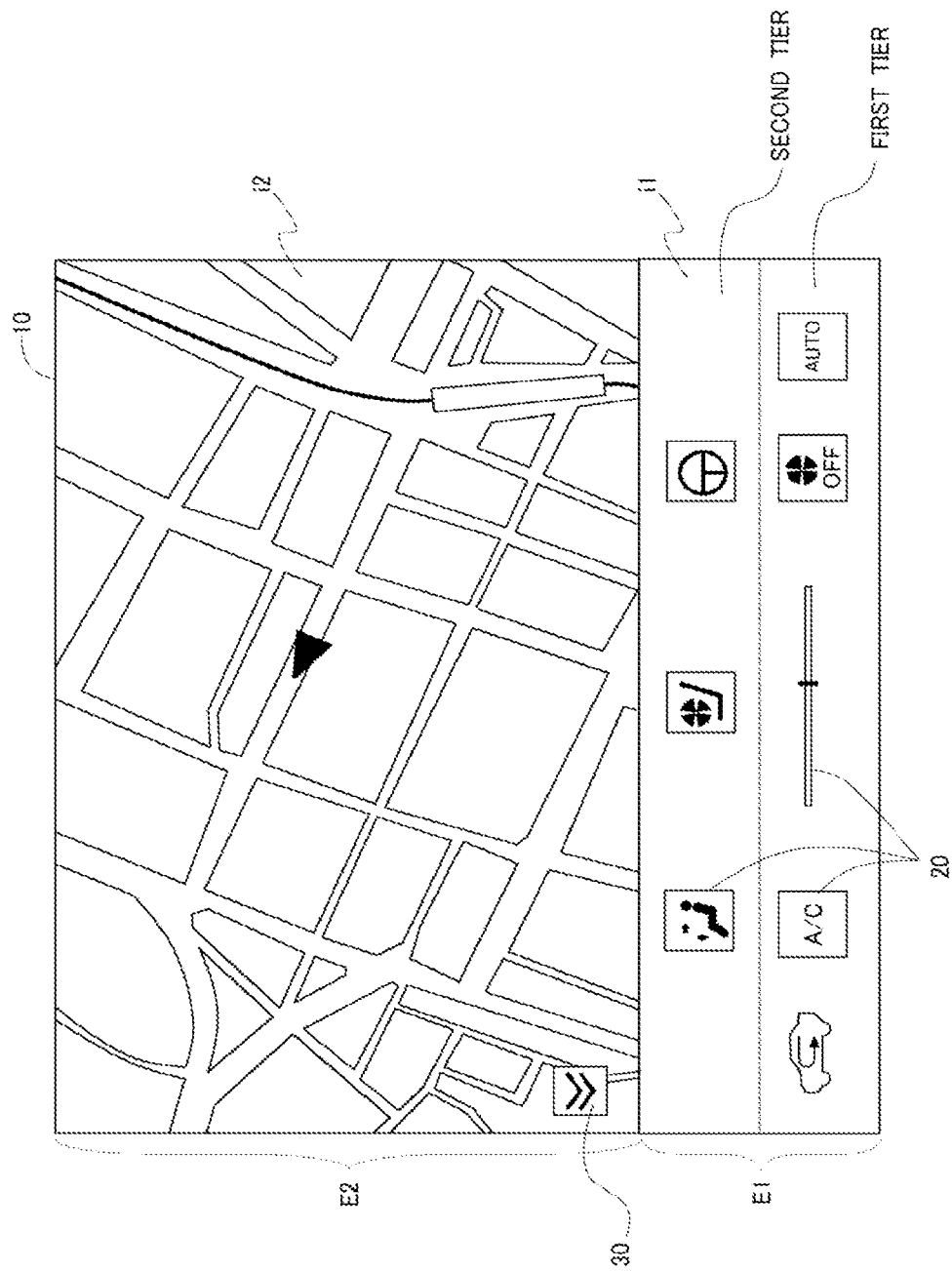
FIG. 2 is a view illustrating a first example of image display on a touchscreen.
Figure 3:
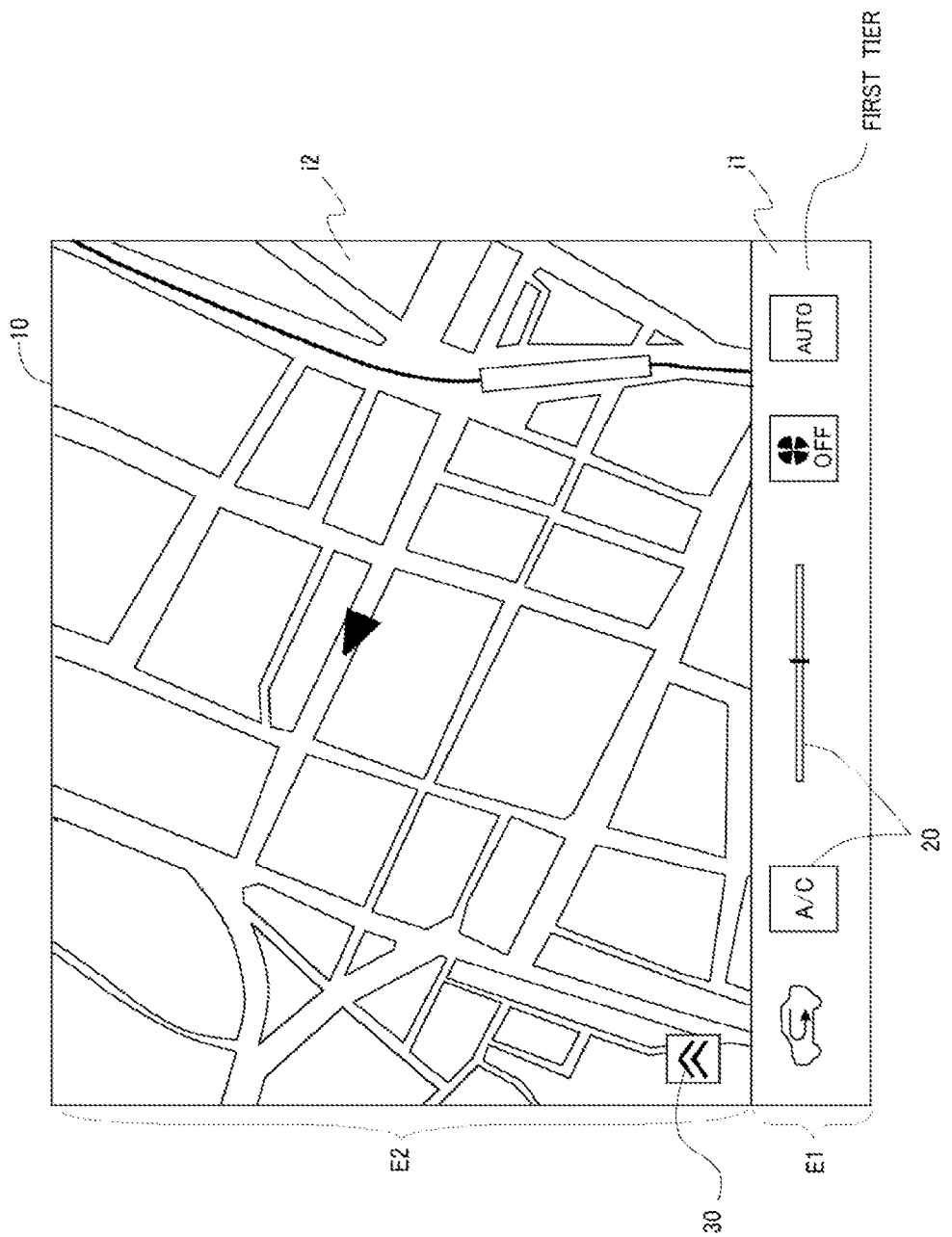
FIG. 3 is a view illustrating a second example of the image display on the touchscreen.

FIG. 2 is a view illustrating a first example of image display on the touchscreen 10 of the vehicle-mounted device 100. FIG. 3 is a view illustrating a second example of the image display on the touchscreen 10 of the vehicle-mounted device 100. In each of FIGS. 2 and 3, a first image i1 and a second image i2 are separately displayed on the touchscreen 10. Note that FIGS. 2 and 3 are different in display pattern. In FIG. 2, the first image i1 and the second image i2 are separately displayed in a first pattern. In FIG. 3, the first image i1 and the second image i2 are separately displayed in a second pattern.

The first image i1 is an image displaying an operation unit that is operated for air conditioning in a vehicle interior of the vehicle 1 or temperature adjustment of pieces of equipment. The operation unit is composed of a plurality of operation icons 20. Each operation icon 20 is an icon indicating a button, a switch, a lever, or the like that is operated for the air conditioning in the vehicle interior or the temperature adjustment of the pieces of equipment. That is, in the vehicle 1, the user performs a touch operation on each operation icon 20 in the first image i1, thereby performing the air conditioning in the vehicle interior or the temperature adjustment of the pieces of equipment.

An air conditioner (A/C) ON/OFF icon, a blower level control icon, a blower OFF icon, an inside/outside air selector icon, an automatic air conditioning ON/OFF icon, an air conditioner blowout mode selector icon, a seat air conditioning ON/OFF icon, and a steering heater ON/OFF icon can be named as the operation icons 20. Note that the icons are merely illustrative and that the operation icons 20 are not limited to icons having such functions.

The second image i2 is image information displaying map information for navigation. As described above, various types of image information to be displayed on the touchscreen 10 are stored in the auxiliary storage 103. The processor 101 acquires image information that is required to be displayed as the first image i1 and image information that is required to be displayed as the second image i2 from the auxiliary storage 103 and separately displays the both images i1 and i2 on the touchscreen 10. Note that image information to be displayed on the touchscreen 10 need not be stored in the auxiliary storage 103. For example, the vehicle-mounted device 100 may have a function of communicating with an external server device via a network. In this case, the processor 101 may receive image information, such as map information for navigation, from the external server device.

Assume here that a region where the first image i1 is displayed and a region where the second image i2 is displayed are a first region E1 and a second region E2, respectively, when the first image i1 and the second image i2 are separately displayed on a screen of the touchscreen 10. As illustrated in FIGS. 2 and 3, a display region is vertically split in two on the screen of the touchscreen 10. A lower region is the first region E1, and an upper region is the second region E2.

In the above-described case, the first pattern illustrated in FIG. 2 and the second pattern illustrated in FIG. 3 are different in the sizes of the first region E1 and the second region E2 on the screen of the touchscreen 10. That is, the second pattern has the smaller first region E1 and the larger second region E2 than the first pattern. Differences in image display between the first pattern and the second pattern will be described below in more detail.

In the first pattern, the first image i1 includes an image in a first tier and an image in a second tier (a broken line indicates a border between the image in the first tier and the image in the second tier in FIG. 2), as illustrated in FIG. 2. A plurality of operation icons 20 and a plurality of operation icons 20 are displayed in the first tier and the second tire, respectively, of the first image i1. In this case, the operation icons 20 displayed in the first tier will be referred to as first operation icons while the operation icons 20 displayed in the second tire will be referred to as second operation icons. The second operation icons here are generally icons which are operated by a user less frequently than the first operation icons. The first operation icons are, for example, an air conditioner (A/C) ON/OFF icon, a blower level control icon, a blower OFF icon, an inside/outside air selector icon, and an automatic air conditioning ON/OFF icon. The second operation icons are, for example, an air conditioner blowout mode selector icon, a seat air conditioning ON/OFF icon, and a steering heater ON/OFF icon.

In contrast, in the second pattern, an image in a first tier alone is displayed as the first image i1, as illustrated in FIG. 3. That is, in the second pattern, the second operation icons are hidden, and the first operation icons alone are displayed in the first image i1. As a result, in the second pattern, the first region E1 on the screen of the touchscreen 10 is smaller than the first region E1 in the first pattern by an amount corresponding to the image in the second tier of the first image i1 that is hidden. In the second pattern, the second region E2 on the screen of the touchscreen 10 is larger than the second region E2 in the first pattern by the amount corresponding to the image in the second tier of the first image i1 that is hidden. For this reason, in the second pattern, a wider range of map information than in the first pattern is displayed as the second image i2 in the second region E2. Note that the number of types of the operation icons 20 displayed in the first image i1 is smaller in the second pattern than in the first pattern. The number of user-adjustable items related to the air conditioning in the vehicle interior or the temperature adjustment of the pieces of equipment is smaller in the second pattern.

As illustrated in FIGS. 2 and 3, a selector icon 30 is displayed on the touchscreen 10 in each display pattern of the first pattern and the second pattern. The selector icon 30 is an icon which is operated to switch between the first pattern and the second pattern. That is, in the vehicle-mounted device 100, a display pattern is switched by a user performing a touch operation on the selector icon 30 when the first image i1 and the second image i2 are separately displayed on the touchscreen 10.

(Switching Control)

Figure 4:
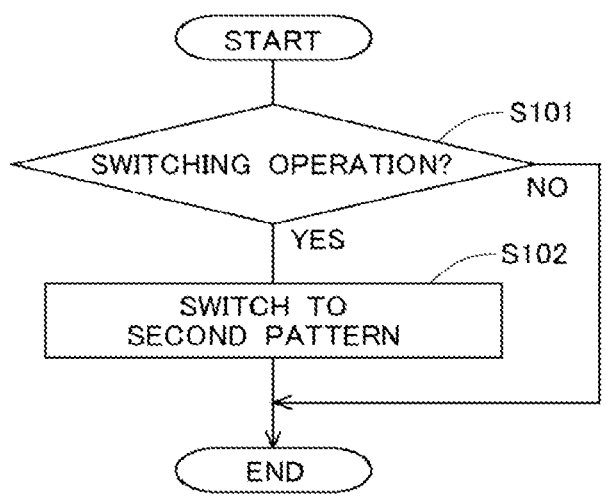
FIG. 4 is a flowchart illustrating a flow of switching control of a display pattern for image display in the vehicle-mounted device, according to a first embodiment.

FIG. 4 is a flowchart illustrating a flow of switching control of the display pattern for image display in the vehicle-mounted device 100, according to the present embodiment. The flow is executed by the processor 101. The flow is assumed to be repeatedly executed at predetermined intervals when the first image i1 and the second image i2 are separately displayed in the first pattern on the touchscreen 10.

In the flow, it is first judged in S101 whether a display pattern switching operation is made by a user. Specifically, it is judged whether a touch operation on the selector icon 30 is detected on the screen of the touchscreen 10. If a touch operation on the selector icon 30 is not detected (NO in S101), the flow is ended.

On the other hand, if a touch operation on the selector icon 30 is detected (YES in S101), a process in S102 is executed. In S102, the display pattern is switched from the first pattern to the second pattern. Specifically, the image in the second tier in the first image i1 is hidden, and a display range for map information in the second image i2 is enlarged. After that, the flow is ended.

When the first image i1 and the second image i2 are separately displayed in the second pattern on the touchscreen 10, display pattern switching control is similarly executed by the processor 101. In this case, when a touch operation on the selector icon 30 is detected, the display pattern is switched from the second pattern to the first pattern. Specifically, the image in the second tier in the first image i1 is displayed, and the display range for the map information in the second image i2 is reduced.

According to the present embodiment, the first image i1 and the second image i2 are separately displayed on the touchscreen 10. This allows a user to operate various types of operation icons 20 in the first image i1 while map information for navigation is displayed as the second image i2. It is thus possible to improve convenience when the user performs the air conditioning in the vehicle interior or the temperature adjustment of the pieces of equipment.

A user can select the first pattern or the second pattern as a display pattern at the time of separately displaying the first image i1 and the second image i2 on the touchscreen 10. For this reason, if the user wishes to display a wider range of map information as map information for navigation, the user can select the second pattern. If the user wishes to more appropriately perform the air conditioning in the vehicle interior or the temperature adjustment of the pieces of equipment, the user can select the first pattern.

In the present embodiment, objects to be hidden in the second pattern are the second operation icons in the first image i1. That is, in the second pattern, the first operation icons that are operated more frequently than the second operation icons in the first image i1 are similarly displayed on the touchscreen 10. It is thus possible to curb reduction in the convenience when a user performs the air conditioning in the vehicle interior and the temperature adjustment of the pieces of equipment that accompanies selection of the second pattern.

Note that map information for navigation is set as image information to be displayed as the second image i2 on the touchscreen 10 in the present embodiment. Note that the image information to be displayed as the second image i2 on the touchscreen 10 is not limited to map information for navigation. For example, the image information to be displayed as the second image i2 on the touchscreen 10 may be image information of video content (i.e., video information). If the vehicle-mounted device 100 has a communication function of connecting to the Internet, the image information to be displayed as the second image i2 on the touchscreen 10 may be image information of a Web page.

Second Embodiment

In the present embodiment, a first image i1 and a second image i2 are separately displayed on a touchscreen 10 of a vehicle-mounted device 100. If image information displaying map information for navigation is displayed as the second image i2, the first image i1 and the second image i2 are separately displayed in a first pattern or a second pattern, as in the first embodiment. Note that, if image information of video content is displayed as the second image i2, an image display pattern on the touchscreen 10 is different from the first pattern and the second pattern in the present embodiment.

(Display Pattern)

Figure 5:
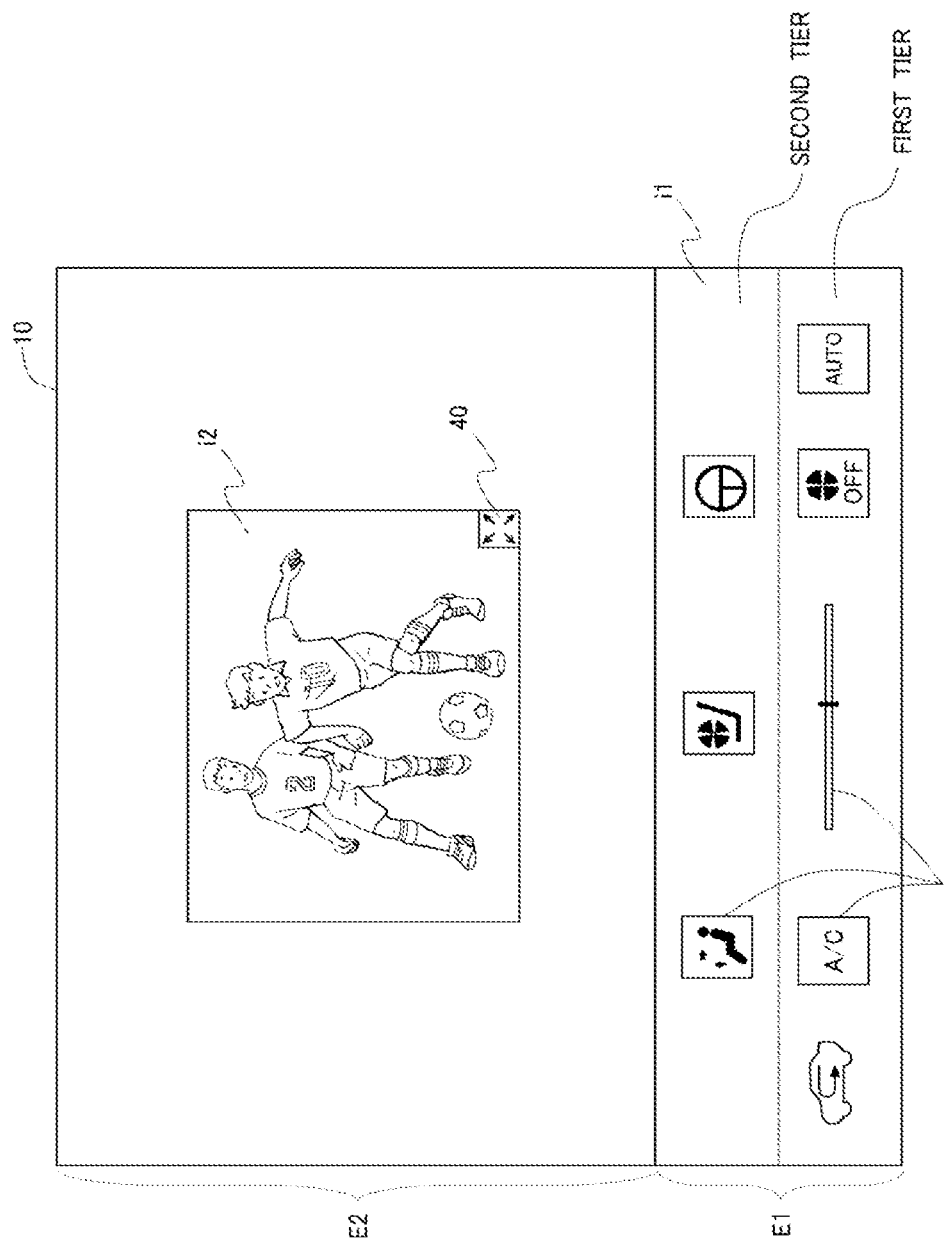
FIG. 5 is a view illustrating a third example of the image display on the touchscreen.
Figure 6:
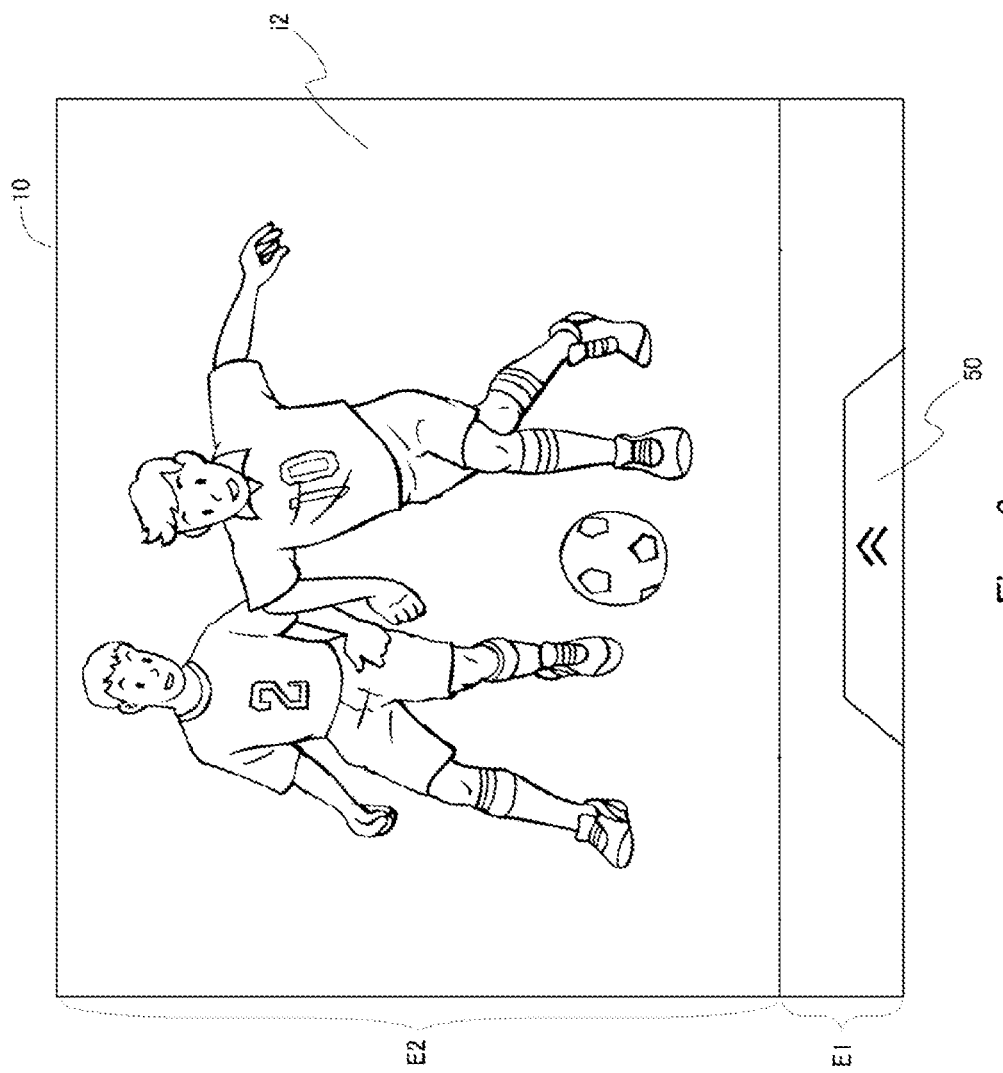
FIG. 6 is a view illustrating a fourth example of the image display on the touchscreen.
Figure 7:
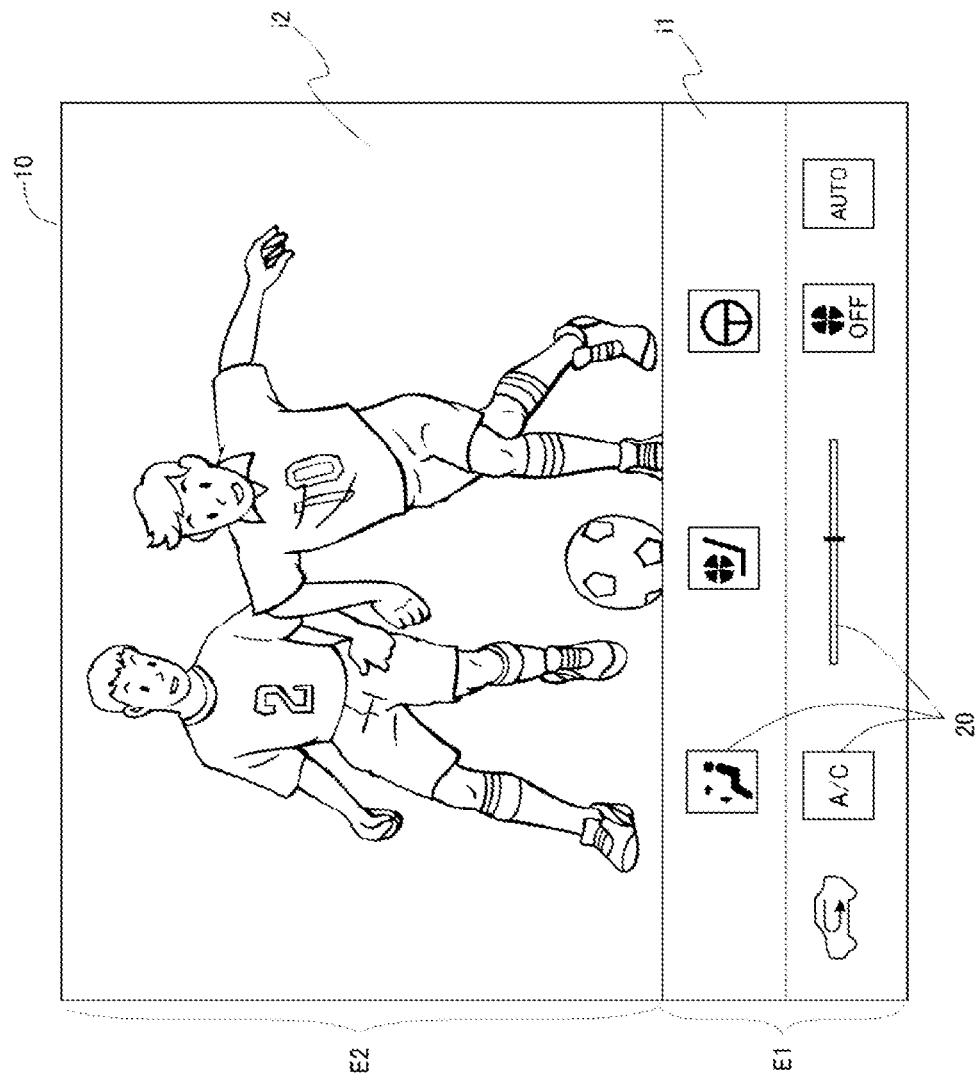
FIG. 7 is a view illustrating a fifth example of the image display on the touchscreen.

FIG. 5 is a view illustrating a third example of image display on the touchscreen 10 of the vehicle-mounted device 100. FIG. 6 is a view illustrating a fourth example of the image display on the touchscreen 10 of the vehicle-mounted device 100. FIG. 7 is a view illustrating a fifth example of the image display on the touchscreen 10 of the vehicle-mounted device 100. In each of FIGS. 5, 6, and 7, image information of video content is displayed as the second image i2. Note that FIGS. 5, 6, and 7 are different in display pattern.

In FIG. 5, the first image i1 and the second image i2 are separately displayed in a third pattern. In the third pattern, displayed contents of and a display region for the first image i1 are the same as displayed contents of and a display region for the first image i1 in the first pattern. That is, in the third pattern, the first image i1 includes an image in a first tier and an image in a second tier, in each of which a plurality of operation icons 20 are displayed. On a screen of the touchscreen 10, the first image i1 is displayed in the same region as a first region E1 in the first pattern.

In the third pattern, the second image i2 is displayed on a reduced scale in a partial region in a second region E2 in the first pattern, on the screen of the touchscreen 10. In the third pattern, a zoom in icon 40 is displayed on the touchscreen 10. The zoom in icon 40 is an icon which is operated to zoom in the second image i2 displayed on the reduced scale. In the vehicle-mounted device 100, the display pattern is switched to a fourth pattern illustrated in FIG. 6 by a user performing a touch operation on the zoom in icon 40 when the first image i1 and the second image i2 are separately displayed in the third pattern on the touchscreen 10.

The second image i2 is displayed in the fourth pattern in FIG. 6. In the fourth pattern, the second image i2 is displayed over the entire second region E2. In the fourth pattern, the first image i1 is hidden on the touchscreen 10. In the fourth pattern, a display icon 50 is displayed on the touchscreen 10 instead of the first image i1. The display icon 50 is an icon which is operated to display the first image i1.

In the fourth pattern, the display icon 50 is displayed in the same region as the first region E1 in the second pattern on the screen of the touchscreen 10. The second region E2 where the second image i2 is to be displayed is enlarged to the same region as the second region E2 in the second pattern 2 on the screen of the touchscreen 10.

That is, in the vehicle-mounted device 100 according to the present embodiment, if image information of video content is displayed as the second image i2 over the entire second region E2 on the screen of the touchscreen 10, the first image i1 is hidden, and the size of the second region E2 is enlarged. This makes it possible to prevent a user from feeling cumbersomeness toward display of the first image i1 when the user views video content with the vehicle-mounted device 100. Additionally, the video content can be displayed with as large a size as possible on the touchscreen 10. Thus, the user can view the video content in a more comfortable state in the vehicle-mounted device 100.

In the vehicle-mounted device 100, the display pattern is switched to a fifth pattern illustrated in FIG. 7 by a user performing a touch operation on the display icon 50 when the second image i2 is displayed in the fourth pattern on the touchscreen 10.

In FIG. 7, the first image i1 and the second image i2 are separately displayed in the fifth pattern. That is, in the fifth pattern, the display icon 50 is hidden in a state where the second image i2 is displayed over the entire second region E2, and the first image i1 is displayed in the first region E1, on the touchscreen 10. This allows a user to perform air conditioning in a vehicle interior or temperature adjustment of pieces of equipment while viewing video content in the vehicle-mounted device 100. Note that image display in the third pattern, the fourth pattern, or the fifth pattern is executed by a processor 101 in the vehicle-mounted device 100.

(Switching Control)

Figure 8:
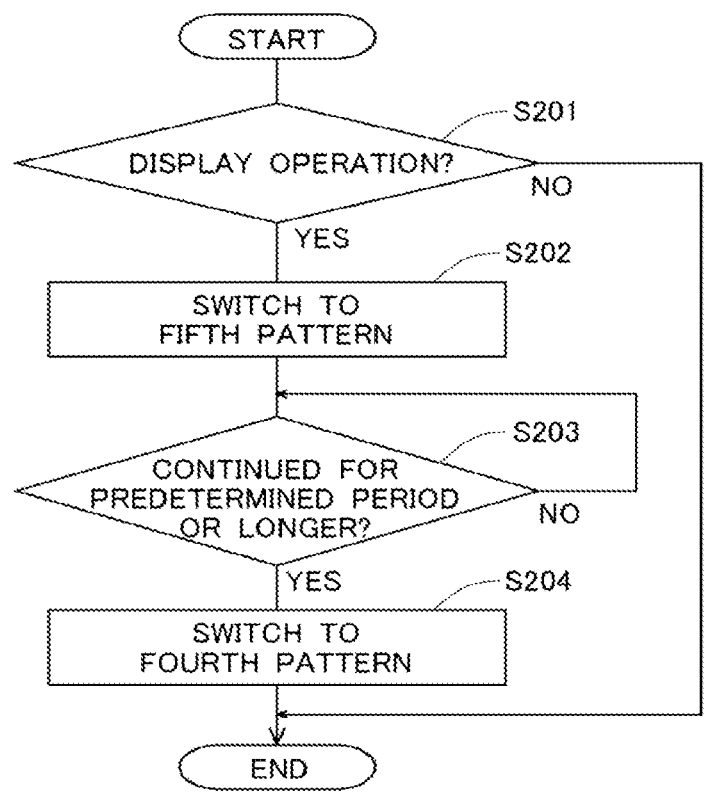
FIG. 8 is a flowchart illustrating a flow of switching control of a display pattern for image display in a vehicle-mounted device, according to a second embodiment.

FIG. 8 is a flowchart illustrating a flow of switching control of the display pattern for image display in the vehicle-mounted device 100, according to the present embodiment. The flow is executed by the processor 101. The flow is assumed to be repeatedly executed at predetermined intervals when the second image i2 is displayed in the fourth pattern on the touchscreen 10.

In the flow, it is first judged in S201 whether an operation to redisplay the first image i1 is performed by a user. Specifically, it is judged whether a touch operation on the display icon 50 is detected on the screen of the touchscreen 10. If a touch operation on the display icon 50 is not detected (NO in S201), the flow is ended.

On the other hand, if a touch operation on the display icon 50 is detected (YES in S201), a process in S202 is executed. In S202, the display pattern is switched from the fourth pattern to the fifth pattern. Specifically, the display icon 50 is hidden in a state where the second image i2 is displayed, and the first image i1 is displayed.

In S203, it is judged whether a state of non-operation on the operation icons 20 of an operation unit in the first image i1 is continued for a predetermined period or longer. Specifically, it is judged whether a state where no touch operation on the operation icons 20 is detected on the screen of the touchscreen 10 is continued for the predetermined period or longer. If the state where no touch operation on the operation icons 20 is detected is not continued for the predetermined period or longer (NO in S203), the process in S203 is executed again. On the other hand, if the state where no touch operation on the operation icons 20 is detected is continued for the predetermined period or longer (YES in S203), a process in S204 is executed. In S204, the display pattern is switched from the fifth pattern to the fourth pattern. Specifically, the first image i1 is hidden, and the display icon 50 is redisplayed. After that, the flow is ended.

With the above-described flow, if the air conditioning in the vehicle interior or the temperature adjustment of the pieces of equipment is not performed for the predetermined period or longer by the user after the display pattern is switched from the fourth pattern to the fifth pattern, the display pattern can be automatically returned to the fourth pattern.

Note that image information of video content corresponds to "predetermined image information" according to the present disclosure in the present embodiment. Note that the predetermined image information according to the present disclosure is not limited to image information of video content and may be different image information.

Other Embodiments

The embodiments described above are merely examples, and the present disclosure may be changed and implemented as appropriate within the scope of the disclosure. Furthermore, processes and means described in the present disclosure may be freely combined to the extent that no technical conflict exists.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMs, EEPROMs, magnetic cards, flash memories, or optical cards.

What is claimed is:

1. A vehicle-mounted device having a touchscreen, comprising
   a controller configured to separately display a first image displaying an operation unit that is operated for air conditioning in a vehicle interior or temperature adjustment of pieces of equipment and a second image displaying image information different from the first image on the touchscreen,
   wherein the vehicle-mounted device has a first pattern and a second pattern as a display pattern for separately displaying the first image and the second image, and the second pattern has a smaller display region for the first image and a larger display region for the second image than the first pattern,
   the controller separately displays the first image and the second image in a display pattern that is either the first pattern or the second pattern,
   the image information displayed as the second image is image information of video content, and
   the controller displays a display icon instead of the first image in the display region for the first image in the second pattern while displaying predetermined image information over a whole of the display region for the second image on the touchscreen, the display icon is configured to be operated to display the first image instead of the display icon in the display region for the first image in the first pattern.

2. The vehicle-mounted device according to claim 1, wherein
   the controller
   displays, on the touchscreen, a selector icon that is operated to switch between the first pattern and the second pattern in separately displaying the first image and the second image, and
   switches between the first pattern and the second pattern when the selector icon is operated.

3. The vehicle-mounted device according to claim 1, wherein
   the operation unit includes one or a plurality of first operation icons and one or a plurality of second operation icons that are operated less frequently than the one or plurality of first operation icons, and
   the controller
   displays the one or plurality of first operation icons and the one or plurality of second operation icons in the first image in separately displaying the first image and the second image in the first pattern, and
   hides the one or plurality of second operation icons and displays the one or plurality of first operation icons alone in the first image in separately displaying the first image and the second image in the second pattern.

4. The vehicle-mounted device according to claim 1, wherein
   the controller
   hides the display icon and separately displays the first image and the second image when the display icon is operated, and
   redisplays the display icon instead of the first image if a state of non-operation on the operation unit in the first image is continued for a predetermined period or longer after the separate display of the first image and the second image.

5. The vehicle-mounted device according to claim 1, wherein
   the predetermined image information is image information of video content.

6. A vehicle equipped with a vehicle-mounted device according to claim 1.

7. A control method for a vehicle-mounted device having a touchscreen, comprising
   separately displaying a first image displaying an operation unit that is operated for air conditioning in a vehicle interior or temperature adjustment of pieces of equipment and a second image displaying image information different from the first image on the touchscreen,
   wherein the vehicle-mounted device has a first pattern and a second pattern as a display pattern for separately displaying the first image and the second image, and the second pattern has a smaller display region for the first image and a larger display region for the second image than the first pattern, and
   the first image and the second image are separately displayed in a display pattern that is either the first pattern or the second pattern in the control method, the image information displayed as the second image is image information of video content, and the control method further comprises displaying a display icon instead of the first image in the display region for the first image in the second pattern while displaying predetermined image information over a whole of the display region for the second image on the touchscreen, the display icon is configured to be operated to display the first image instead of the display icon in the display region for the first image in the first pattern.

8. The control method for the vehicle-mounted device according to claim 7, further comprising:

displaying, on the touchscreen, a selector icon that is operated to switch between the first pattern and the second pattern in separately displaying the first image and the second image; and switching between the first pattern and the second pattern when the selector icon is operated.

9. The control method for the vehicle-mounted device according to claim 7, wherein the operation unit includes one or a plurality of first operation icons and one or a plurality of second operation icons that are operated less frequently than the one or plurality of first operation icons, and in the control method, the one or plurality of first operation icons and the one or plurality of second operation icons are displayed in the first image when the first image and the second image are separately displayed in the first pattern, and the one or plurality of second operation icons are hidden, and the one or plurality of first operation icons alone are displayed in the first image when the first image and the second image are separately displayed in the second pattern.

10. The control method for the vehicle-mounted device according to claim 7, further comprising:

hiding the display icon and separately displaying the first image and the second image when the display icon is operated; and redisplaying the display icon instead of the first image if a state of non-operation on the operation unit in the first image is continued for a predetermined period or longer after the separately displaying the first image and the second image.

11. The control method for the vehicle-mounted device according to claim 7, wherein the predetermined image information is image information of video content.

* * * * *